(12) United States Patent
Vetters et al.

(10) Patent No.: US 8,720,815 B2
(45) Date of Patent: May 13, 2014

(54) AIRCRAFT PROPULSION SYSTEM

(75) Inventors: Daniel Kent Vetters, Indianapolis, IN (US); Robert Wayne Cedoz, Indianapolis, IN (US); David Eames, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 746 days.

(21) Appl. No.: 12/768,585

(22) Filed: Apr. 27, 2010

(65) Prior Publication Data

US 2011/0259996 A1 Oct. 27, 2011

(51) Int. Cl.
*B64D 27/00* (2006.01)

(52) U.S. Cl.
USPC ............... 244/54; 244/55; 244/53 B; 60/796; 60/797; 60/39.34

(58) Field of Classification Search
USPC ............. 244/54, 55, 53 B; 60/796, 797, 204, 60/39.15, 39.34
See application file for complete search history.

(56) References Cited

U.S. PATENT DOCUMENTS

| | | |
|---|---|---|
| 3,837,602 A | 9/1974 | Mullins |
| 4,171,786 A | 10/1979 | Krenz |
| 4,437,627 A | 3/1984 | Moorehead |
| 4,449,683 A | 5/1984 | Gratzer et al. |
| 4,799,633 A | 1/1989 | Lahti et al. |
| 4,801,058 A | 1/1989 | Mullins |
| 4,821,980 A | 4/1989 | Clausen et al. |
| 4,917,336 A | 4/1990 | Jacobs et al. |
| 4,940,196 A | 7/1990 | Lardellier |
| 4,976,102 A | 12/1990 | Taylor |
| 5,064,144 A | 11/1991 | Chee |
| 5,653,406 A | 8/1997 | Amano et al. |
| 5,775,638 A | 7/1998 | Duesler |
| 5,779,191 A | 7/1998 | Brislawn |
| 6,364,254 B1 | 4/2002 | May |
| 6,581,874 B2 | 6/2003 | Lemire et al. |
| 6,824,092 B1 | 11/2004 | Franklin, III et al. |
| 7,107,755 B2 * | 9/2006 | El Hamel et al. ............... 60/224 |
| 7,669,785 B2 | 3/2010 | Shmilovich et al. |
| 2008/0105781 A1 | 5/2008 | Belleville |
| 2009/0159757 A1 | 6/2009 | Yoeli |

OTHER PUBLICATIONS

International Search Report and Written Opinion, PCT/US2011/034082, Rolls-Royce North American Technologies Inc., Dec. 22, 2011.

* cited by examiner

*Primary Examiner* — J. Woodrow Eldred
(74) *Attorney, Agent, or Firm* — Krieg DeVault LLP

(57) ABSTRACT

An aircraft propulsion system is disclosed herein. The aircraft propulsion system includes a core engine having an intake, a compressor section, a combustor section, and a turbine section arranged along a centerline axis. The aircraft propulsion system also includes a nacelle surrounding the core engine. The aircraft propulsion system also includes at least one free power turbine driven to rotate by exhaust gases exiting the turbine section. The aircraft propulsion system also includes at least one rotor module driven to rotate by at least one free power turbine. The aircraft propulsion system also includes first and second pylons extending away from the nacelle and operable to mount the core engine to an aircraft. The first and second pylons are spaced from one another on opposite sides of at least one plane containing the centerline axis and mirror one another across the at least one plane.

28 Claims, 4 Drawing Sheets

AIRCRAFT PROPULSION SYSTEM

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of F33615-00-D-3052 awarded by the Department of Defense.

BACKGROUND OF THE INVENTION

1. Field of the Invention

The invention relates to a system for propelling an aircraft.

2. Description of Related Prior Art

U.S. Pat. No. 5,653,406 discloses a nacelle apparatus for an airplane. The nacelle apparatus for an airplane is of the type having nacelles for jet engines suspended under a wing via pylons includes lip-shaped small wings corresponding to the nacelles for the jet engines. Each lip-shaped small wing extends from the upper trailing edge of each nacelle to the opposite sides of a pylon. The nacelle apparatus assures that lift/drag properties of the nacelle apparatus can be improved by reducing a magnitude of drag induced by aerodynamic interference of the main wing with the nacelle.

SUMMARY OF THE INVENTION

In summary, the invention is an aircraft propulsion system. The aircraft propulsion system includes a core engine having an intake, a compressor section, a combustor section, and a turbine section arranged along a centerline axis. The aircraft propulsion system also includes a nacelle surrounding the core engine. The aircraft propulsion system also includes at least one free power turbine driven to rotate by exhaust gases exiting the turbine section. The aircraft propulsion system also includes at least one rotor module driven to rotate by the at least one free power turbine. The aircraft propulsion system also includes first and second pylons extending away from the nacelle and operable to mount the core engine to an aircraft. The first and second pylons are spaced from one another on opposite sides of at least one plane containing the centerline axis and mirror one another across the at least one plane.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXEMPLARY EMBODIMENTS

Figure 1:
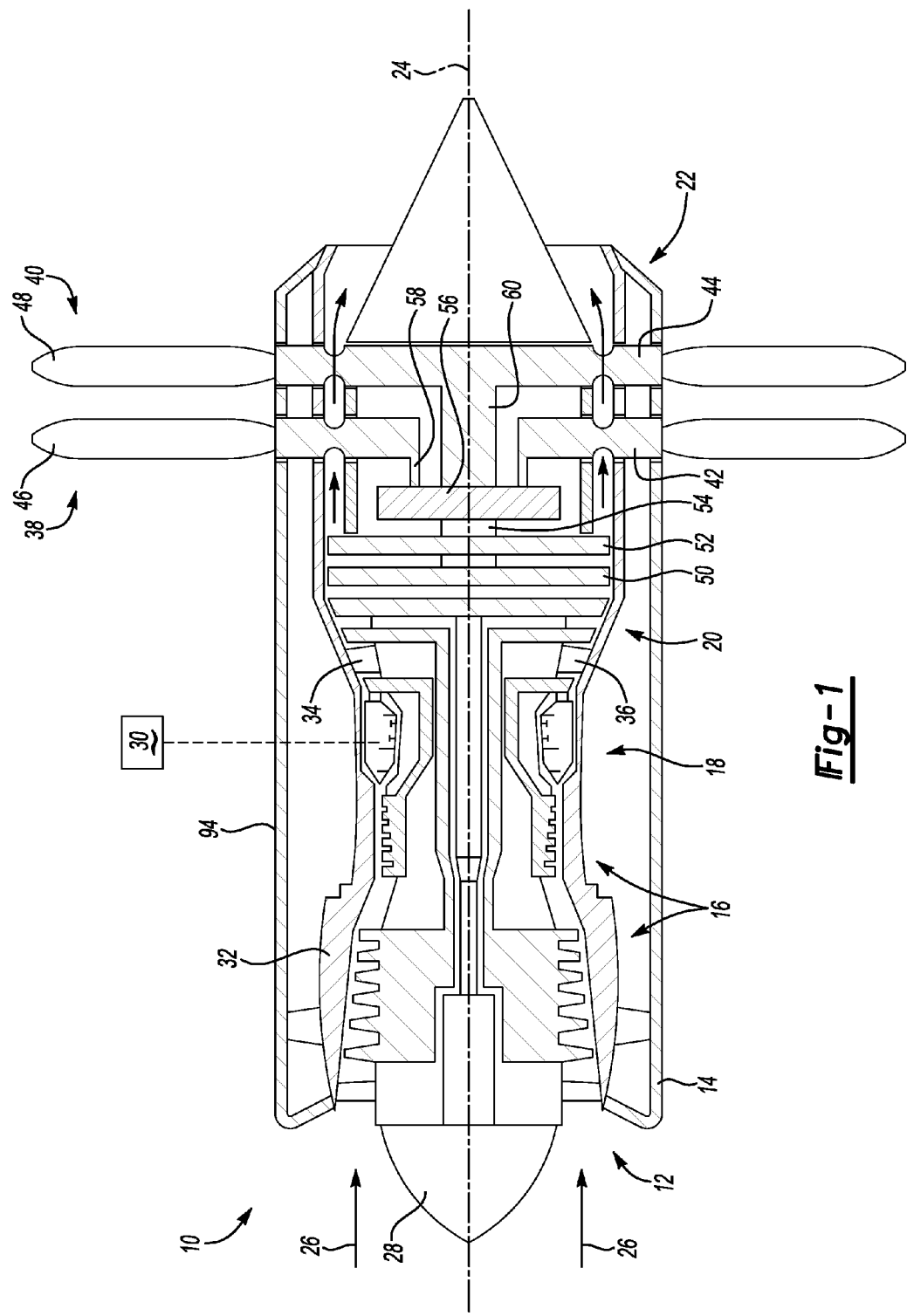
FIG. 1 is a schematic representation of a turbine engine for practicing an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The invention, as shown in the exemplary embodiments below, can provide a mounting configuration for mounting an open rotor aircraft propulsion system in a manner which can maximize the stiffness of the mounting structures while minimizing the weight of the engine mounting structures. The embodiments can also minimize the extent that the mounting structures block air flow (increasing drag and distortion entering the rotors). Further, one of the embodiments described below can also be applied to change a pitch of the engine to optimize the pitch of the propulsion system throughout the flight envelope.

The open rotor mounting configuration resulting from practicing an embodiment of the invention would allow an optimal trade between weight, stiffness, and rotor inlet distortion. This would help meet whole engine and rotor blade dynamic requirements. The lower weight and reduced drag would reduce the amount of fuel burned for any given flight, as well as lower operating costs and emissions.

FIG. 1 is a schematic representation of a turbine engine that can be incorporated in a first exemplary embodiment of the invention. A turbine engine 10 can include an inlet 12 and be housed in a nacelle 14. The turbine engine 10 can also include a compressor section 16, a combustor section 18, and a turbine section 20. The turbine engine 10 can also include an exhaust section 22. The compressor section 16, combustor section 18, turbine section 20, and exhaust section 22 can be arranged along a centerline axis 24. Components of the compressor section 16 and the turbine section 20 can rotate about the centerline axis 24. Fluid such as air can be drawn into the turbine engine 10 as indicated by the arrows referenced at 26. The fluid enters the compressor section 16 from the inlet 12 and is compressed. A nose cone 28 can be proximate to the inlet 12 to gently direct air into the compressor section 16. The schematically shown compressor section 16 includes high and low pressure compressor sections. In some embodiments, a portion of the fluid can be diverted radially outside of the compressor section 16 and thereby become bypass flow. The compressed fluid emerging from the compressor section 16 is mixed with fuel from a fuel system 30 and ignited in the combustor section 18. Combustion gases exit the combustor section 18 and flow through the turbine section 20. Energy is extracted from the combustion gases in the turbine section 20.

A turbine case 32 can encircle the core engine components (the compressor, combustor and turbine sections 16, 18, 20). The case 32 can support non-rotating structures such as compressor vanes (not shown) and turbine vanes. Exemplary turbine vanes are referenced at 34 and 36 and can be positioned to direct the flow of combustion gases to the turbine section 20. The combustion gases passing aft of the turbine section are referenced by unnumbered arrows. These gases can be applied to generate thrust for an aircraft.

In the open rotor configuration shown in FIG. 1, power can be drawn from the core engine components to rotate rotors 38, 40. Each of the rotors or rotor modules respectively includes a hub portion 42, 44 and a plurality of blades, such as blades 46, 48. In the exemplary embodiment, one or more free power turbines, such as turbines 50, 52 can drive a shaft 54. Combustion gases pass over and thereby cause rotation of the free power turbines 50, 52.

The shaft 54 can extend into a gear box 56. Respective drive shafts 58, 60 can extend from the gear box 56. The drive shaft 58 is fixed for rotation with the hub portion 42 of the rotor 38. The drive shaft 60 is fixed for rotation with the hub portion 44 of the rotor 40. In operation, the gears (not shown) of the gear box 54 can transmit the power input by the shaft 54 into counter-rotation of the rotors 38 and 40. The schematic illustration of FIG. 1 is a "pusher" open rotor configuration and it is noted that embodiments of the invention can be practiced with "tractor" open rotor configuration wherein the rotors are forward/upstream of the compressor section.

Propeller applications can encounter "1P" moment loads. These are moment loads that occur as a result of any cross-flow coming into the propellers or rotors. In theory, in a set of rotating airfoils with perfectly axial flow entering the airfoils, each airfoil is experiencing the same environment including angle of incidence on the leading edge, regardless of the position of the airfoil about the circumference. This is generally a good approximation of a typical turbofan since the inlet manages the incoming flow at the fan face such that it is all essentially axial and uniform. A propeller or open rotor however has no inlet. Therefore it is subjected to any cross-flow in the ambient environment or due to maneuvering. Take-off is typically a challenging operating condition since there can be a severe cross-wind with very little forward velocity from the aircraft. As the forward velocity increases the effect of a given cross wind velocity is reduced since the resulting vector of the air entering the rotor plane becomes more axial. The result on the rotor or propeller blades is that all the blades encounter a different environment and therefore different loading based on the position of the blade about the circumference. For instance, the blades on the top side can be rotating such that they are turning into the cross wind while the blades on the bottom side would be turning out of the cross-wind. This can lead to significantly different incidence angles on the leading edges and therefore drastically different loading on the airfoils going across the top compared to the airfoils traversing the bottom. The net result of these non-uniform loads is called the 1P loads. These include a 1P Moment Load and a 1P Normal Force which acts at a given angle, or vector. The normal force is in the plane of rotation acting through the center of the propellers. These are significant loads which turbo-props have to deal with. Open rotors also encounter these loads. Although, the 1P moment loads in an open rotor can tend to cancel each other if the rotors are counter rotating. However, the normal forces will be additive.

Figure 2:
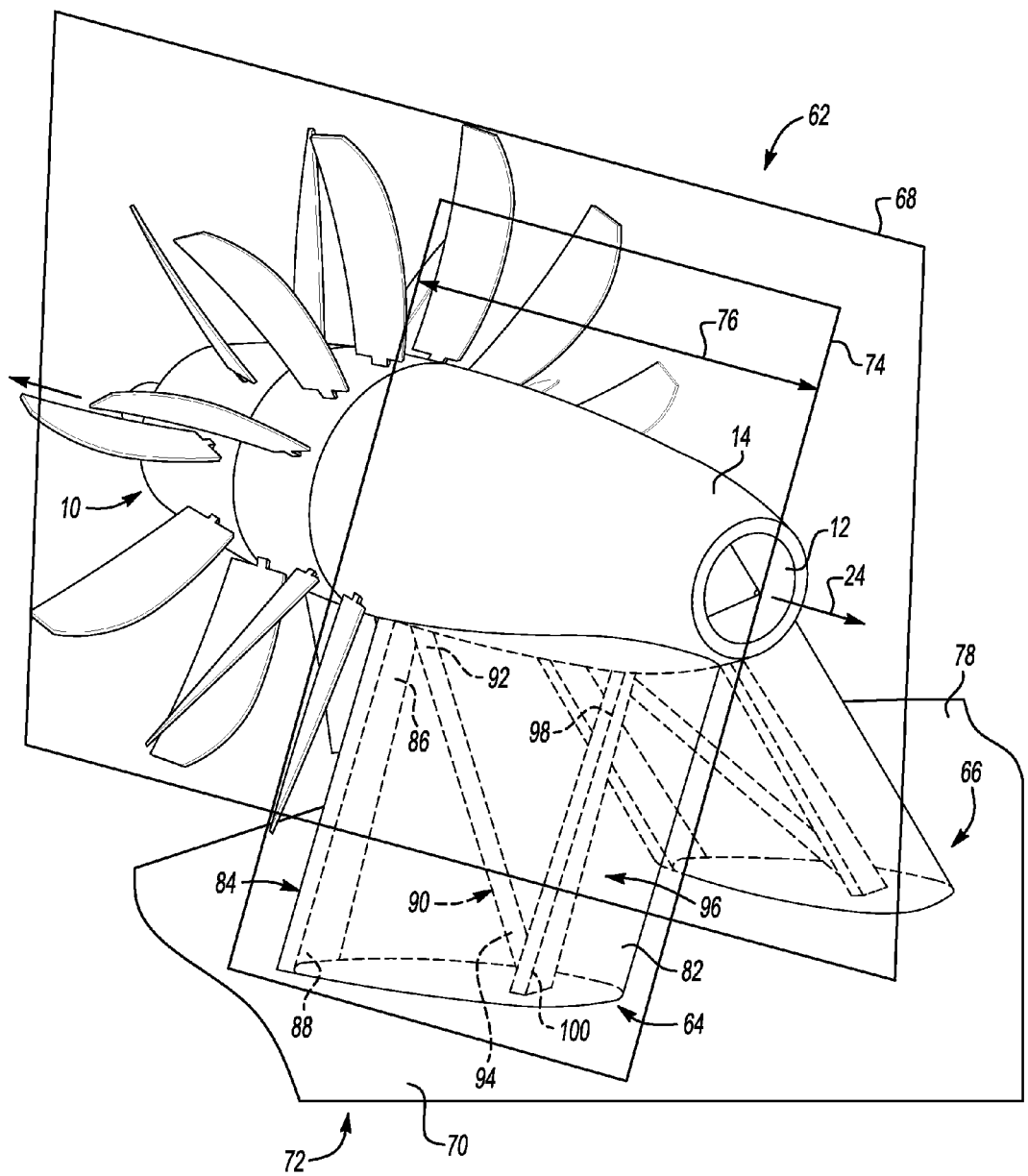
FIG. 2 is a perspective of view of an exemplary embodiment of the invention.

FIG. 2 shows a first exemplary embodiment of the invention in which an aircraft propulsion system 62 includes the turbine engine 10 shown schematically in FIG. 1. For brevity, all of the structures shown in FIG. 1 will hereafter be referred to as the turbine engine 10 unless otherwise indicated. The aircraft propulsion system 62 also includes first and second pylons 64, 66 extending away from the nacelle 14 and operable to mount the core engine to an aircraft 78. The first and second pylons 64, 66 are spaced from one another on opposite sides of at least one plane containing the centerline axis 24. This plane is referenced at 68 in FIG. 2. The first and second pylons 64, 66 mirror one another across the at least one plane 68. The plane 68 can be normal to a surface 70 of a wing 72 on which the aircraft propulsion system 62 is mounted (only a portion of the wing 72 is shown in FIG. 2). In other embodiments, the plane 68 can be oriented different than normal to a wing.

The first and second pylons 64, 66 can be substantially centered on respective first and second longitudinal pylon planes. The first and second pylons 64, 66 can extend in the respective first and second longitudinal pylon planes. A longitudinal pylon plane can be a plane extending through a center of a pylon. The longitudinal pylon plane for the first pylon 64 is referenced at 74. The first and second longitudinal pylon planes can intersect one another. For example, the first and second longitudinal pylon planes can intersect along an intersection line referenced at 76. The intersection line 76 can lie in the plane 68 as well as each of the first and second longitudinal pylon planes. The intersection line 76 can extend parallel to the centerline axis 24.

Figure 5:
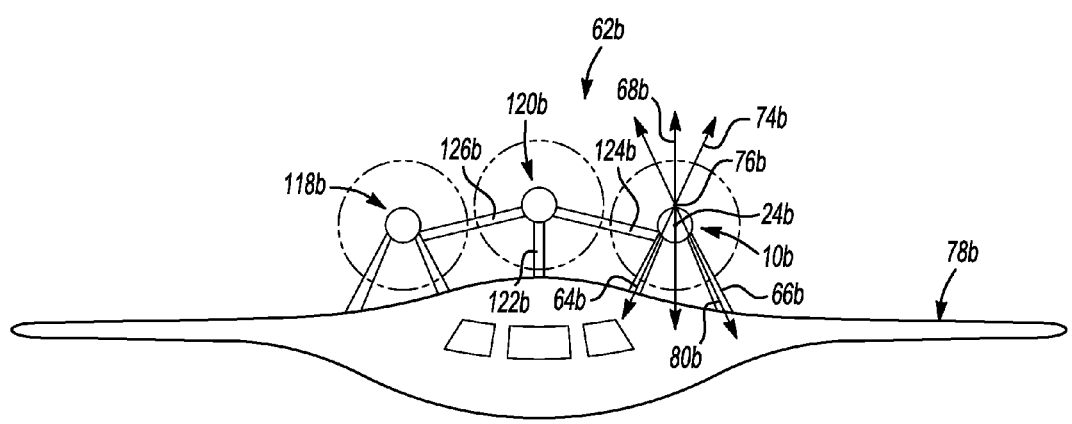
FIG. 5 is a front view of another exemplary embodiment of the invention in practice on an aircraft.

FIG. 5 shows a front view of another embodiment of the invention. An aircraft propulsion system 62b including a turbine engine 10b and pylons 64b and 66b is shown mounted on an aircraft 78b. The first and second pylons 64b, 66b can be substantially centered on and extend in respective first and second longitudinal pylon planes 74b, 80b. The first and second longitudinal pylon planes 74b, 80b intersect along an intersection line 76b. The intersection line 76b and a centerline axis 24b extend in the plane 68b and are parallel to one another.

Referring again to FIG. 2, each of the first and second pylons 64, 66 can be similarly structured. The structure of the first pylon 64 will be described in greater detail below and the description can also apply to the second pylon 66. The first pylon 64 can include a cowling 82 enclosing one or more support beams. The cowling 82 can be a streamlined metal housing or removable covering forming a generally continuous line with the wing 72. A portion of the cowling 82 is removed in FIG. 2 to reveal the internal structure of the exemplary first pylon 64. It is noted that the structure for a pylon according to an embodiment of the invention could be separate beams and links with a fairing wrapped around them (as described), or the beams and fairing could be integrated together such that the outer cowling would also be part of the structure (with access panels).

The first pylon 64 can also include an aft beam 84 extending between first and second ends 86, 88. The first end 86 is mounted to the core engine of the turbine engine 10 at a first position along the centerline axis 24. The first position is proximate to a composite center of gravity of the core engine, the nacelle, the at least one free power turbine, and the at least one rotor module. The first position can be defined along the centerline axis 24 but is not necessarily on the centerline axis 24. The first position can be spaced radially from the centerline axis 24. The second end 88 can be mounted to the wing 72.

The first pylon 64 can also include a thrust beam 90 extending between first and second ends 92, 94. The first end 92 is mounted to the core engine at the first position. The respective second ends 88 and 94 of the aft beam 84 and the thrust beam 90 are spaced from one another along the centerline axis 24. The first pylon 64 can also include a fore beam 96 extending between first and second ends 98, 100. The first end 98 is mounted to the core engine at a second position along the centerline axis 24, spaced closer to the intake or inlet 12 than the first position. The respective second ends 94, 100 of the fore beam 96 and the thrust beam 90 can be proximate to one another.

Figure 3:
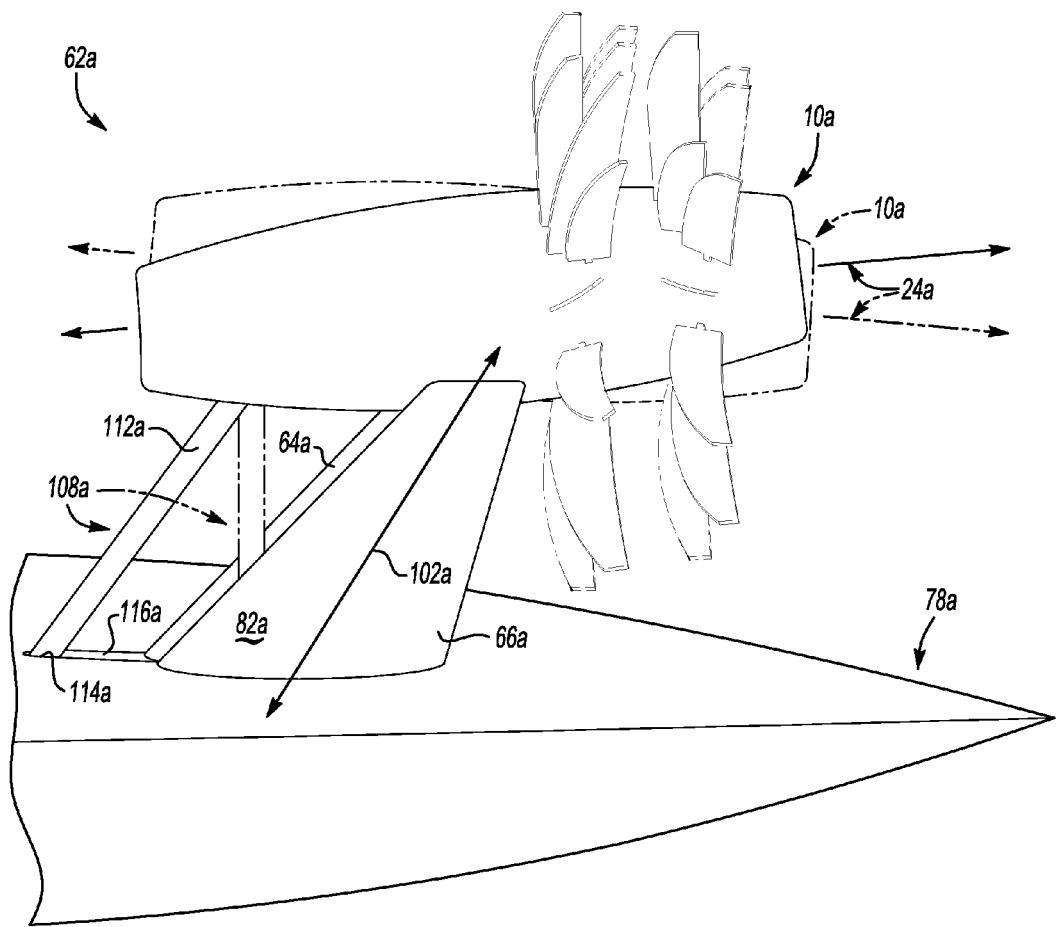
FIG. 3 is a side view of another exemplary embodiment of the invention in practice on an aircraft.
Figure 4:
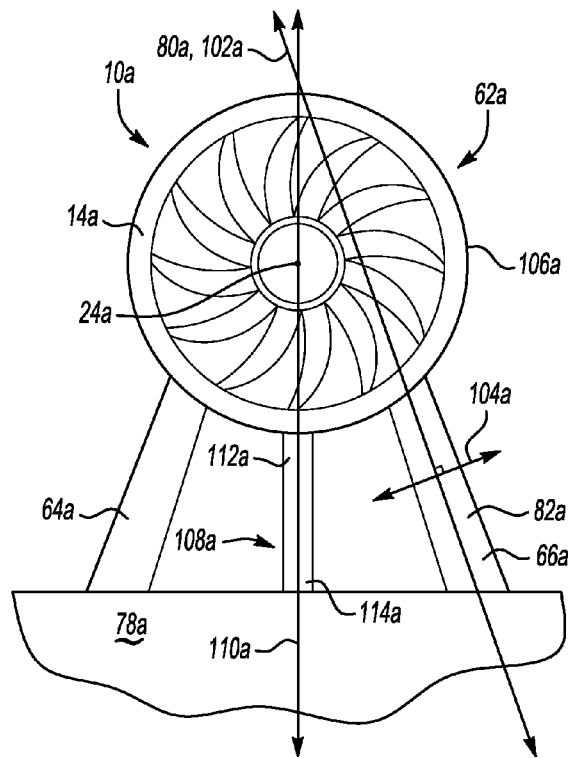
FIG. 4 is a front view of the embodiment shown in FIG. 3.

FIGS. 3 and 4 show side and front views, respectively, of another embodiment of the invention. An aircraft propulsion system 62a includes a turbine engine 10a and pylons 64a and 66a is shown mounted on an aircraft 78a. The first and second pylons 64a, 66a have a variable cross-sectional area. Each cross-sectional area of the respective pylons 64a, 66a can be defined in a transverse pylon plane that is normal to the respective longitudinal pylon plane. For example, the pylon 66a can be centered on a central axis 102a shown in FIG. 3. FIG. 4 shows the central axis 102a contained in the longitudinal pylon plane 80a. FIG. 4 also shows a transverse pylon plane 104a for the pylon 66a. The transverse pylon plane 104a in which a particular cross-section of the pylon 66a can be defined is thus perpendicular to the central axis 102a.

As shown by FIGS. 3 and 4, the cowling 82a can flare outward between the first end proximate to the turbine engine 10a and a second end proximate to the aircraft 78a. The first and second pylons 64a, 66a can have a smallest cross-sectional area proximate to the first end to minimize the disruption of airflow. It is noted that the pylons 64a, 66a can include aft and thrust beams as disclosed in the previous embodiment. It is also noted that any arrangement of beams can applied to practice embodiments of the invention. The arrangement of beams can define a determinate system in which each beam is subject to loading along only one axis, its central axis. Alternatively, the arrangement of beams can define an indeterminate system in which one or more beams is subject to loading along more than one axis.

FIG. 4 also shows the exemplary aircraft propulsion system 62a including a third pylon 108a disposed between the first and second pylons 64a, 66a relative to a circumferential perimeter 106a of the nacelle 14a. The first and second pylons 64a, 66a are mounted to the turbine engine 10a at a first position along the centerline axis 24a and the third pylon 108a is mounted to the turbine engine 10a at a second position along the centerline axis 24a spaced from the first position. A pylon used to practice an embodiment of the invention can include beams and a cowling, such as first and second pylons 64a, 66a, or can be simply a beam such as the third pylon 108a. A central axis 110a of the third pylon 108a can be coplanar with the centerline axis 24 and not coplanar with respective central axes of both of the first and second pylons 64a, 66a.

The third pylon 108a can extend between first and second ends 112a, 114a wherein the first end 112a is mounted to the turbine engine 10a at the second position along the centerline axis 24a. The second end 114a can be moveable to change an orientation of the centerline axis 24a relative to the first and second pylons 64a, 66a. The first end 112a can be pivotally mounted to the turbine engine 10a. The second end 114a can be moved to shift the position of the turbine engine 10a and the rotor modules. As best shown in FIG. 3, the second end 114a can be moved along the body of the aircraft 78a from a forward position (shown in solid line) to an aft position (shown in phantom). When the second end 114a is moved between the forward and aft positions, the orientation of the centerline axis 24a relative to the aircraft 78a changes. The first a second pylons 64a, 66a can also be pivotally mounted to the turbine engine 10a to support pivoting movement of the turbine engine 10a.

In the embodiment shown in FIGS. 3 and 4, the third pylon 108a can be moved by any means, such as hydraulically, pneumatically, or by an electronic drive screw/worm. The second end 114a of the exemplary third pylon 108a can be moved along the aircraft 78a. In other embodiments of the invention, the third pylon can be moved differently. For example, FIG. 3 shows a slot 116a in the aircraft 78a for accommodating movement of the third pylon 108a. In other embodiments, the second end of a third pylon could extend and retract along a path substantially perpendicular to an aircraft.

The tripod embodiment of the invention described above could enable actively controlling the pitch of the turbine engine 10a throughout a flight. This could be helpful in optimizing performance by better aligning the thrust line of the aircraft propulsion system optimally as the center of gravity of the aircraft changes throughout the flight envelope due to fuel burn. This pivoting of the aircraft propulsion system could also account for changes in aircraft weight from flight to flight depending on the loaded weight of the aircraft (the amount of people, luggage, and/or cargo). It could also allow the aircraft propulsion system to operate at a different thrust line during take-off and during cruise, thereby optimizing performance. These advantages would result in less fuel burn per flight, lowering operating costs and emissions. An additional advantage of a pivoting open rotor propulsion system on a hybrid wing aircraft is as follows. A hybrid wing aircraft with open rotor propulsion systems mounted above the wing typically results in a large moment arm between the line of thrust from the propulsion system and the center of gravity of the aircraft. The effect this has during landing and thrust reversal is that the reversed thrust creates a moment that tends to reduce (or eliminate) the load on the front tire of the aircraft. This is problematic since the front tire is used for steering the aircraft on the ground. By pivoting the propulsion system, the moment arm upon which the reversed thrust acts can be reduced, minimizing this issue.

FIG. 5 shows another embodiment for practicing the broader invention. The aircraft 78b includes a plurality of core engines, each core engine having an intake, a compressor section, a combustor section, and a turbine section arranged along a respective. One of these core engines is incorporated in the turbine engine 10b and is arranged along the centerline axis 24b. A plurality of nacelles can be applied in the embodiment in FIG. 5, each nacelle surrounding one of the plurality of core engines. A plurality of free power turbines can be applied in the embodiment in FIG. 5, each free power turbine positioned aft of one of the turbine sections and driven to rotate by exhaust gases exiting the respective turbine section. A plurality of rotor or propeller modules can be applied in the embodiment in FIG. 5, each rotor module driven to rotate by one of the plurality of free power turbines. The first and second pylons 64b, 66b extend away from the turbine engine 10b and are operable to mount the respective core engine to the aircraft 78b. A second turbine engine 118b can be similar to turbine engine 10b and be mounted to the aircraft 78b. A third turbine engine 120b can be mounted to the aircraft 78b with a single pylon 122b. A first cross-member 124b can extend between the turbine engine 10b and the turbine engine 120b. A second cross-member 126b can extend between the turbine engine 118b and the turbine engine 120b. The first and second cross members 124b, 126b can minimize the loads such as side loads and moments about the centerline of the engine. Also, the pylon 122b can be smaller, while the overall mounting of the turbine engine 120b can be significantly stiffer.

The pusher open rotor configuration applied in the exemplary embodiments results in a more optimized position of the center of gravity for pivoting of the nacelle because it moves the center of gravity much further aft than normal, nearly aligning it with the aft engine mount. This means that loads can be more directly transferred into the aft engine mounts with minimal bending loads going through the engine casing, such as casing 32 described above. It also means that relatively little load gets reacted at the front engine mount. This is advantageous since a front pylon or fore beam can be minimal in size & strength. Further, for a tripod arrangement any actuation hardware has lower loads to react and/or overcome to be able to tilt the aircraft propulsion system up or down.

Embodiments of the invention could be applied to both a pusher- or puller-type open rotor configurations. An issue with open rotor propulsion systems is that they can require mounting further from the airframe, resulting in heavier, less stiff pylons. The stiffness of the pylon can be problematic due to its influence on the whole engine dynamics of the propulsion system, core engine, and/or rotor modules.

In a tractor embodiment of the invention, the tripod mounting arrangement could be mirrored front to back such that the static pylons would attach at the front engine mounts, behind the tractor open rotor module, while the single, central link would attach at the rear engine mount and would still be capable of moving to pitch the propulsion system. This would still maintain the same advantage as the pusher configuration by placing the center of gravity of the propulsion system near the static pylon attachment point (and rotating axis). This is because moving the open rotor module from the aft end to the front end would swing the center of gravity close to the forward engine mount plane.

The figures of the application show embodiments of the invention being mounted over a wing or body surface of an aircraft. Practicing the invention this way is not required, but would result in noise shielding of the aircraft propulsion system from the ground during flight. These embodiments can also result in the center of gravity of the aircraft propulsion system being moved forward. These embodiments can also lower rotor module inlet plane distortion levels (which would be increased if the trailing edge of the airframe were immediately in front of the rotor module).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. An aircraft propulsion system comprising:
    a core engine having an intake, a compressor section, a combustor section, and a turbine section arranged along a centerline axis;
    a nacelle surrounding said core engine;
    at least one free power turbine driven to rotate by exhaust gases exiting said turbine section;
    at least one rotor module driven to rotate by said at least one free power turbine; and
    first and second pylons extending away from said nacelle and operable to mount said core engine to an aircraft, wherein said first and second pylons are spaced from one another on opposite sides of at least one plane containing said centerline axis and mirror one another across said at least one plane.

2. The aircraft propulsion system of claim 1 wherein said first and second pylons are substantially centered and extend in respective first and second longitudinal pylon planes and wherein said first and second longitudinal pylon planes intersect one another.

3. The aircraft propulsion system of claim 2 wherein said first and second longitudinal pylon planes intersect along an intersection line extending parallel to said centerline axis.

4. The aircraft propulsion system of claim 1 wherein each of said first and second pylons further comprise:
    a first beam having first and second ends wherein said first end of said first beam is mounted to said core engine at a first position along said centerline axis proximate to a composite center of gravity of said core engine, said nacelle, said at least one free power turbine, and said at least one rotor module.

5. The aircraft propulsion system of claim 4 wherein each of said first and second pylons further comprise:
    a second beam having first and second ends wherein said first end of said second beam is mounted to said core engine at said first position, wherein said respective second ends of said first beam and said second beam are spaced from one another along said centerline axis.

6. The aircraft propulsion system of claim 4 wherein each of said first and second pylons have a variable cross-sectional area, wherein each cross-sectional area is defined in a transverse pylon plane being normal to said respective longitudinal pylon plane.

7. The aircraft propulsion system of claim 6 wherein each of said first and second pylons have a smallest cross-sectional area proximate to said first end of said first beam.

8. The aircraft propulsion system of claim 4 wherein each of said first and second pylons further comprise:
    a second beam having first and second ends wherein said first end of said second beam is mounted to said core engine at a second position along said centerline axis spaced closer to said intake than said first position; and
    a third beam having first and second ends wherein said first end of said third beam is mounted to said core engine at said first position, wherein said respective first ends of said first beam and said third beam are proximate to one another and said respective second ends of said second beam and said third beam are proximate to one another.

9. An aircraft propulsion system comprising:
    a core engine having an intake, a compressor section, a combustor section, and a turbine section arranged along a centerline axis;
    a nacelle surrounding said core engine;
    at least one free power turbine driven to rotate by exhaust gases exiting said turbine section;
    at least one rotor module driven to rotate by said at least one free power turbine; and
    first and second pylons extending away from said nacelle and operable to mount said core engine to an aircraft, wherein said first and second pylons are spaced from one another on opposite sides of at least one plane containing said centerline axis and mirror one another across said at least one plane; and
    a third pylon disposed between said first and second pylons relative to a circumferential perimeter of said nacelle, wherein said first and second pylons are mounted to said core engine at a first position along said centerline axis and said third pylon is mounted to said core engine at a second position along said centerline axis spaced from the first position.

10. The aircraft propulsion system of claim 9 wherein a central axis of said third pylon is coplanar with said centerline axis and not coplanar with respective central axes of both of said first and second pylons.

11. The aircraft propulsion system of claim 9 wherein said third pylon extends between first and second ends wherein said first end is mounted to said core engine at said second position along said centerline axis and wherein said second end is moveable to change an orientation of said centerline axis relative to said first and second pylons.

12. The aircraft propulsion system of claim 1 wherein said rotor module is disposed in one of a pusher and tractor configuration relative said core engine.

13. The aircraft propulsion system of claim 1 wherein said rotor module further comprises a pair of counter-rotating rotors.

14. A method comprising the steps of:
arranging an intake, a compressor section, a combustor section, and a turbine section of a core engine along a centerline axis;
surrounding the core engine with a nacelle;
positioning at least one free power turbine to be driven to rotate by exhaust gases exiting the turbine section;
driving at least one rotor module to rotate with the at least one free power turbine; and
extending first and second pylons away from the nacelle each being operable to mount the core engine to an aircraft, wherein the first and second pylons are spaced from one another on opposite sides of at least one plane containing the centerline axis and mirror one another across the at least one plane.

15. A method comprising the steps of:
arranging an intake, a compressor section, a combustor section, and a turbine section of a core engine along a centerline axis;
surrounding the core engine with a nacelle;
positioning at least one free power turbine to be driven to rotate by exhaust gases exiting the turbine section;
driving at least one rotor module to rotate with the at least one free power turbine;
extending first and second pylons away from the nacelle each being operable to mount the core engine to an aircraft, wherein the first and second pylons are spaced from one another on opposite sides of at least one plane containing the centerline axis and mirror one another across the at least one plane; and
pivotally mounting the core engine to the first and second pylons.

16. The method of claim 15 further comprising the step of:
pivotally mounting the core engine to a third pylon disposed between the first and second pylons relative to a circumferential perimeter of the nacelle, wherein the first and second pylons are mounted to the core engine at a first position along the centerline axis and the third pylon is mounted to the core engine at a second position along the centerline axis spaced from the first position.

17. The method of claim 16 further comprising the step of:
moving an end of the third pylon spaced from the core engine to shift the position of the rotor module.

18. An aircraft propulsion system comprising:
a plurality of core engines, each core engine having an intake, a compressor section, a combustor section, and a turbine section arranged along a respective centerline axis;
a plurality of nacelles, each nacelle surrounding one of said plurality of core engines;
a plurality of free power turbines, each free power turbine driven to rotate by exhaust gases exiting said turbine section;
a plurality of rotor modules, each rotor module driven to rotate by one of said plurality of free power turbines;
first and second pylons extending away from at least one of said plurality of nacelles and operable to mount said respective core engine to an aircraft, wherein said first and second pylons are spaced from one another on opposite sides of at least one plane containing said respective centerline axis of said respective core engine and mirror one another across said at least one plane; and
a cross-member extending between a first of said nacelles and a second of said nacelles.

19. An aircraft propulsion system comprising:
a plurality of core engines, each core engine having an intake, a compressor section, a combustor section, and a turbine section arranged along a respective centerline axis;
a plurality of nacelles, each nacelle surrounding one of said plurality of core engines;
a plurality of free power turbines, each free power turbine driven to rotate by exhaust gases exiting said turbine section;
a plurality of rotor modules, each rotor module driven to rotate by one of said plurality of free power turbines; and
first and second pylons extending away from at least one of said plurality of nacelles and operable to mount said respective core engine to an aircraft, wherein said first and second pylons are spaced from one another on opposite sides of at least one plane containing said respective centerline axis of said respective core engine and mirror one another across said at least one plane, wherein said first and second pylons extend away from a first nacelle of said plurality of nacelles and wherein a third pylon alone extends from a second nacelle of said plurality of nacelles, said first and second nacelles adjacent to one another.

20. The aircraft propulsion system of claim 19 further comprising:
a cross-member extending between said first and second nacelles.

21. The aircraft propulsion system of claim 1 wherein said at least one rotor module comprises an open rotor including a hub portion and a plurality of propeller blades extending radially from said hub portion and outwardly beyond said nacelle to thereby define an open rotor propulsion system.

22. The aircraft propulsion system of claim 1 wherein said first and second pylons extend from said nacelle to an outer surface of said aircraft; and
wherein said rotor module includes a plurality of blades extending radially outward beyond said nacelle and having blade tips that are spaced radially from said outer surface.

23. The method of claim 14 further comprising providing an open rotor propulsion system wherein the at least one rotor module comprises an open rotor including a hub portion and a plurality of propeller blades extending radially from the hub portion and outwardly beyond the nacelle.

24. The method of claim 14 wherein the first and second pylons extend from said nacelle to an outer surface of the aircraft; and
wherein the rotor module includes a plurality of blades extending radially outward beyond the nacelle and having blade tips that are spaced radially from the outer surface.

25. The aircraft propulsion system of claim 1 wherein said first and second pylons are pivotally mounted to said core engine.

26. The aircraft propulsion system of claim 1 wherein each of said first and second pylons include opposite engine mount ends spaced from one another along said centerline axis, said first engine mount end mounted to said core engine at a first position along said centerline axis proximate to a composite center of gravity of said core engine, said nacelle, said at least one free power turbine, and said at least one rotor module.

27. The method of claim 14 wherein each of said first and second pylons include opposite engine mount ends spaced from one another along the centerline axis; and
   mounting the first engine mount end of the first and second pylons to the core engine at a first position along the centerline axis proximate to a composite center of gravity of the core engine, the nacelle, the at least one free power turbine, and the at least one rotor module.

28. The aircraft propulsion system of claim 18 wherein said cross-member extends from a first of said core engines surrounded by said first nacelle to a second of said core engines surrounded by said second nacelle.

* * * * *